Sept. 12, 1939.   E. J. HEFELE   2,172,536
RADIO DIRECTION FINDING
Original Filed June 17, 1932    5 Sheets-Sheet 1

Inventor,
Edward J. Hefele
By Ivan P. Tashof
Attorney

Sept. 12, 1939.　　　　　E. J. HEFELE　　　　　2,172,536
RADIO DIRECTION FINDING
Original Filed June 17, 1932　　　5 Sheets-Sheet 2

Inventor,
Edward J. Hefele

By Ivan P. Tashof,
Attorney

Sept. 12, 1939.  E. J. HEFELE  2,172,536
RADIO DIRECTION FINDING
Original Filed June 17, 1932   5 Sheets-Sheet 3

Inventor,
Edward J. Hefele
By Ivan P. Tashof,
Attorney

Sept. 12, 1939.  E. J. HEFELE  2,172,536
RADIO DIRECTION FINDING
Original Filed June 17, 1932  5 Sheets-Sheet 4

Fig. 10.
Antenna Output

Fig. 11.

Fig. 12.
Receiver Law
Output
Input

Fig. 13.

Fig. 14.
Receiver Output

Fig. 18.
Output
Input

Fig. 24.
Output
Input

Inventor
Edward J. Hefele
By Ivan P. Tashof,
Attorney

Patented Sept. 12, 1939

2,172,536

UNITED STATES PATENT OFFICE 2,172,536

RADIO DIRECTION FINDING

Edward Joseph Hefele, Amityville, N. Y., assignor, by mesne assignments, to Airplane & Marine Direction Finder, Inc., a corporation of Delaware Original application June 17, 1932, Serial No. 617,793, now Patent No. 2,044,789, dated June 23, 1936. Divided and this application June 20, 1936, Serial No. 86,409

7 Claims. (Cl. 250—11)

My invention relates to improved methods of and apparatus for radio direction finding, and particularly to apparatus for and methods of operating directional receiving systems, using an antenna having directional sensitivity.

This application is a division of my application Serial No. 617,793, filed June 17, 1932, now Patent No. 2,044,789, granted June 23, 1936.

An object of the invention is to provide novel means for and methods of improving the directional characteristics of conventional types of directional antenna.

Another object of the invention is to secure a predetermined non-linear relationship between the input and output voltages of the radio directional receiving system.

A still further object of the invention is to so modify the energy received from a directional antenna as to distort the normal polar diagram characteristic of the type of directional antenna used so as to greatly enhance the value of the directional characteristics.

A further object of the invention is to provide novel means for securing a predetermined non-linear relationship between the input and output voltages of a directional receiving system.

Another important object of the invention is to provide novel means for and method of obtaining great directional sensitivity when utilizing the maximum signal method of direction finding.

A still further object of the invention is to secure the above specified results either in the receiver itself, in its associated indicator, or by a combination of the two.

Another object of the invention is to accomplish these results by means of automatic gain control or by utilizing variable mu vacuum tubes having a predetermined exponential amplification factor, or by a combination of both.

A further object of the invention is to utilize the improved results above enumerated for measuring distances between radio transmitting and receiving locations by a more accurate indication of changes in the field intensity at the receiving or measuring location.

Other objects of the invention will appear in the detailed description of the invention as hereinafter set forth.

Directional reception depends upon the non-uniform directional absorbing power of an antenna. In polar coordinates, this characteristic is expressed by any diagram other than one having a constant radius.

The most common form of a directional antenna is the simple loop or symmetrical dipole. Its directional characteristic is expressed in polar coordinates by a figure 8 pattern. That is, the electromotive force induced in such an antenna when used for receiving radiant energy varies with the angular position of the antenna as the cosine of the angle.

Another familiar form of directional antenna consists of a combination of a loop and non-directional vertical antenna. Its characteristic describes in polar coordinates a curve known as the cardioid or heart-shaped diagram. This system is known in the art as a uni-directional receiving system.

Another form of uni-directional antenna commonly used in reception of short waves consists of a series of spaced conductors or antennae forming a so-called "antenna array". Its directional sensitivity is great in a given direction and small in all other directions and is expressed in polar coordinates by an elongated or exaggerated ellipse.

As described above, the directional characteristics depend on the change of radii in the polar diagram of the antenna. When the rate of change of the radii is great, the directional sensitivity is correspondingly great. Inasmuch as in known systems the rate of change of the radii is quite considerable at or near the null position and is very slight at or near the maximum position, the null method of direction finding has been used in preference to the maximum method.

To state this as applied to practical long wave direction finding, the accuracy of observation depends upon the sensitivity of the indicator to small changes in the electromotive force impressed upon it. This electromotive force varies with the angular rotation of the loop antenna used in such systems and is normally expressed by a sine curve in rectangular coordinates and by a figure 8 pattern formed by two tangential circles of equal diameter, in polar coordinates.

This characteristic figure 8 pattern is used in direction finding by noting the direction of the loop antenna either when the signals are loudest or weakest, the former is known as the maximum method and the latter as the minimum or null method of direction finding.

From an inspection of the normal figure 8 pattern, it will be observed that for maximum signals, the radius of curvature is large so that there is a small rate of change of output voltage with variation in angular position of the loop antenna. For minimum signals, the radius of curvature is small and, accordingly, there is a large rate of change of output voltage and variation in angular position of the loop antenna.

I have discovered that this rate of change obtained in the output of the receiver for both the maximum and for the minimum positions may be accentuated by varying the input-output voltage relationship in the receiving system or at the indicator or by a combination of both. This then correspondingly accentuates the over-all characteristic of the entire system and increases the sensitivity of the readings at either the maximum or minimum positions.

When the null method is used, the figure of eight pattern is flattened by causing the input-output relationship of either the receiver, or indicator, or both, to vary non-linearly and in accordance with the expression:

$$(1) \qquad \frac{\Delta E}{\Delta e} = X$$

where $e$=input voltage, $E$=output voltage, $\Delta e$=increment of input voltage, $\Delta E$=increment of output voltage, and X is some variable that approaches zero as $\Delta e$ increases; that is, the rate of change of output with respect to rate of change of input is made such that the ratio of rate of change of output to rate of change of input becomes smaller as the input is increased.

When the maximum method of reception heretofore found unsuitable, is used according to my invention, the figure 8 pattern is elongated by causing the input-output relationship of either the receiver or indicator or both to vary non-linearly and in accordance with the expression:

$$(2) \qquad \frac{\Delta E}{\Delta e} = X$$

where $e$=input voltage, $E$=output voltage, $\Delta e$=increment in input voltage, $\Delta E$=increment in output voltage, and X is some variable that approaches infinity as $\Delta e$ increases; that is, the rate of change of output with respect to rate of change of input is made such that the ratio of rate of change of output to rate of change of input becomes larger as the input is increased.

The invention will be made clearer from the detailed description following, in connection with the drawings in which.

Figures 10, 11:
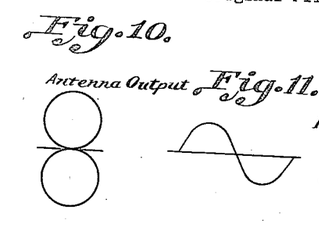
Figures 10 to 27 are curves in both polar and linear coordinates showing the relation between antenna energy and indicator response obtained by using this improved system.

Referring to the drawings, I have illustrated in Figure 10 the normal figure 8 pattern drawn to polar coordinates illustrating the relationship between various angular positions of the loop and the voltage generated therein; and in Figure 11 I have shown the same relationship drawn to rectangular coordinates.

As has already been explained, the normal loop response curve heretofore used for direction finding may be represented either as a figure 8 consisting of two tangential circles of equal diameter as shown in Figure 10, or by a sine curve, as shown in Figure 11.

Figures 12, 13, 14:
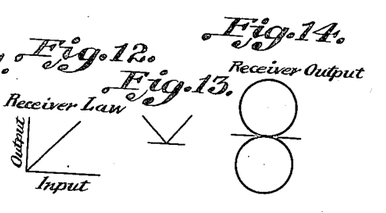

A similar figure 8 is obtained in the output of the radio receiver when the rate of change of the output voltage with respect to the rate of change of input voltage is constant, as expressed in the Equation 1 when X—constant $k$, and illustrated in Figure 12.

Figure 7:
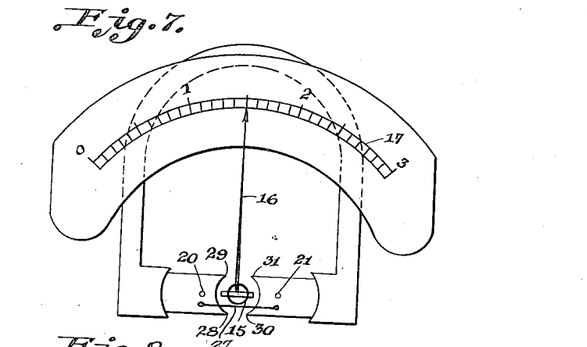
Figure 7 illustrates an indicating instrument incorporating a form of my invention but with the field poles in the positions heretofore used in direction finder systems.
Figure 15:
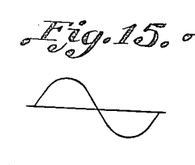
Figures 16, 17:
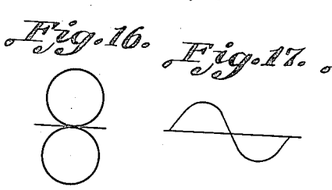

In this case, the curve of Figure 12 is a straight line so that the response of an indicator such as shown in Figure 7, connected to the output of the radio receiver, varies directly with the voltage (from the loop) applied to the radio receiver as indicated in Figures 14 and 15. Because the curve, Figure 15, is steep at or near the null position, the response is sharp. Figure 13 is drawn to rectangular coordinates and indicates the over-all response of the loop, receiver, and indicator for various angular positions of the antenna near the null. It has substantially the shape of the sine curve about its null region, the lower half of the wave being turned back on itself to indicate more clearly the sharpness of response.

In the case described above, a radio receiver having a straight line amplifying characteristic is used and a very much sharper null than a maximum is obtainable. In fact, there is no sharply defined maximum position.

In accordance with my invention, radio circuits and receivers are employed to produce a more sharply defined null position or, alternately, a sharply defined maximum position. In one embodiment of this invention, it is accomplished by utilizing circuits having non-linear amplifying characteristics as, for example, by employing automatic gain control and variable mu tubes.

Figure 4:
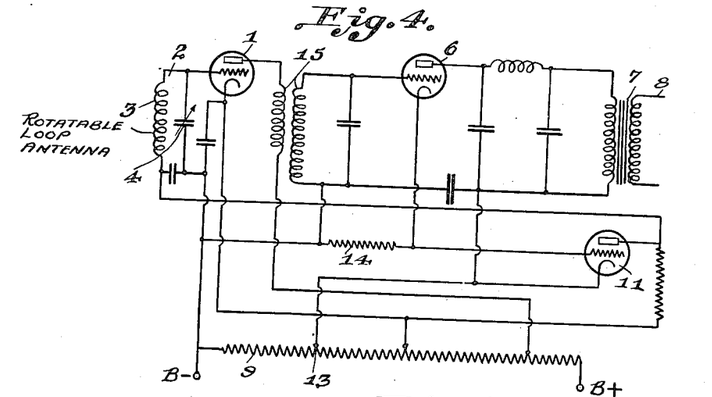
Figure 4 is a circuit diagram illustrating a form of my invention wherein automatic gain control is employed in a receiver used in direction finding.

In Figure 4, there is disclosed one form of automatic gain control. As will be well understood, input energy from a directional antenna 3, which may be of the rotatable loop type, is applied to the control electrode of the first tube 1 through the tuned circuit 2, comprising the inductance of the loop 3 and variable condenser 4 connected across the loop. The output from the tube 1 is applied through the transformer 15 to the input of a detector or demodulator tube 6. The output from the tube 6 in turn flows through the audio frequency transformer 7 to an audio frequency amplifying circuit indicated by the winding 8, and thence to an indicator (not shown).

The grid of the control tube 11 has applied to it a direct current voltage only. The cathode of the control tube is connected to the position 13 on the voltage divider 9 of the direct-current supply (not shown) so that it has a more positive bias than the grid. The tube is, therefore, normally biased beyond the plate current cut-off point, but as the detector tube cathode bias becomes more positive, the control tube 11 commences to draw plate current and effectively biases the grid of the tube 1 in accordance with the carrier strength. To accomplish this, the cathode bias resistor 14 of the detector tube 6 has developed across it a voltage which increases as the carrier increases.

As the potential applied across the input of the first tube increases, the gain control functions to decrease the amplifying characteristic by changing the grid potential of the tube 1. Similarly, other tubes than 1 may be controlled by this system if desired.

Figure 18:
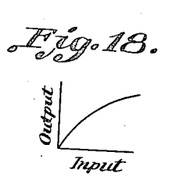

With this arrangement, the amplification characteristic or gain of the radio receiver becomes non-linear that is to say, as expressed in Formula 1, X approaches zero since the gain is high for low voltage input and decreases as the input voltage increases. This describes a curve, Figure 18. The resulting figure 8 is the deformed or flattened figure, illustrated in Figure 20. The steepness of curvature at or near the null position has been considerably increased and is illustrated to better advantage by the rectilinear co-ordinate Figure 21. This increased steepness of curvature at the null has, of course, resulted in an increased flattening of the curve at its maximum. Thus, the system has become more sensitive at or near the null and less sensitive at the maximum than has been heretofore obtained.

Figures 19, 20, 21, 22, 23, 24, 25, 26, 27, 28:
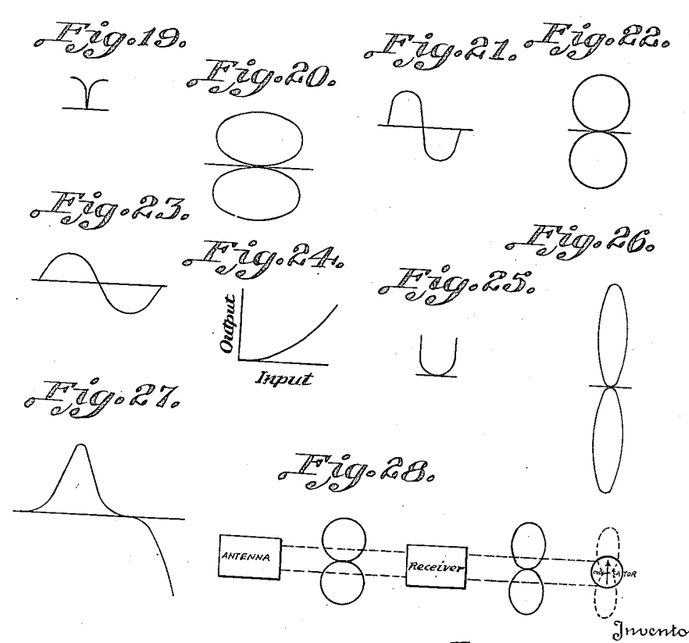
Figure 28 is a diagrammatic illustration of the directional characteristics at different successive points of the receiving apparatus.

A sharpened null position response curve is indicated by Figure 19 wherein the indicator response increases rapidly with the slightest variation from the null position.

Practical conditions conforming to the requirements of Equation 1 are easily obtained by the use of variable mu tubes having decreasing amplification constants for increasing grid bias potential.

These tubes may operate according to either an exponential or logarithmic law as follows:

Where X is less than 1, an expontial equation:

(3) $E_{output} = e^x{}_{input}$ is obtained

Where X is greater than 1, a logarithmic equation:

(4) $E_{output} = Log_a e_{input}$ is obtained

Both the above conform to the general conditions stated in Equation 1.

This characteristic can be further accentuated by the combination of variable mu tubes and automatic gain control.

Although only one form of automatic gain control has been described for purposes of illustration, other forms of automatic gain control may be used in this invention.

Thus, for example, other well known automatic gain control systems may be used in inverted relation so that the gain of the receiver increases with increase in voltage impressed across the receiver. The gain of the radio receiver will then be low for low voltage inputs and high for the high voltage inputs, producing a response curve, as shown in Figure 24.

The figure 8 pattern is elongated as shown in Figure 26 so that the receiving circuit's sensitivity at the maximum is much greater than in Figure 14 and particularly the flattened figure 8 pattern of Figure 20. This is more clearly shown when drawn to rectangular coordinates in Figure 27, wherein the maximum is shown sharply defined. A more sensitive response at the maximum is thus obtained at the expense of sensitivity at the null as shown diagrammatically in Figure 25.

In the above, circuit arrangements have been described for increasing the sensitivity at the null and at the maximum. As is well understood, the maximum method is much preferred to the null method but has not been extensively used because of lack of clear definition of the maximum. According to this invention, the maximum now becomes so sharply defined that it can be used, in practice, with the same degree of accuracy as the null method. Other circuit arrangements and mechanisms for carrying out this invention also may be used.

Figure 1:
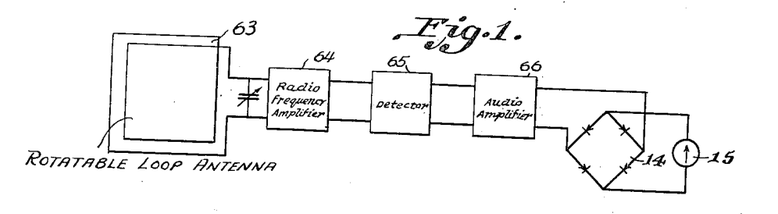
Figure 1 is a circuit diagram of one embodiment of the invention.

In Figure 1, I have schematically shown a loop antenna 63 which is rotatably mounted on a vertical spindle (not shown) to permit rotation thereof in a manner now well known in the art. The tuned antenna circuit is connected across the input terminals of a radio frequency amplifier 64, the output of which is connected to a detector 65 which in turn is connected to an audio frequency amplifier 66. This is now well known in the art and accordingly is illustrated diagrammatically.

The output current from the audio frequency amplifier is applied in turn through the system of rectifiers at 14 to the indicating instrument 15. As shown, the four rectifier elements, which may be of the copper oxide type, are connected as a full wave rectifier 14 in the form of a Wheatstone bridge, the indicating instrument 15 being connected across the output thereof. The positive half of the pulsating current in the output circuit of the audio frequency amplifier flows through the rectifier system 14, in one direction only to the instrument 15. The negative half of the pulsating current flows from the output of the audio frequency amplifier through the rectifier 14 in the opposite direction and in the same direction as the first half cycle through the instrument 15. Both halves of the rectified currents thus flow through the instrumest 15 in the same direction.

Because of the comparatively large power consumption and delicacy of alternating current measuring instruments, such as thermal, iron vane and dynamometer types, measuring instruments for direction finding equipment are inherently confined to the direct current or rectifier type which have been found to be more rugged. Sensitivity requirements are such that it is customary to employ instruments producing full scale deflection with currents of 1 to 2 milliamperes. These output measuring instruments are connected to the radio receiving circuit through a rectifier as, for example, vacuum tube type or copper oxide type of rectifiers.

However, the resistance of solid rectifiers changes for different current densities per square centimeter of rectifier; the resistances being quite large for current densities in milliamperes per square centimeter, decreasing rapidly as the current density is increased at first and thereafter decreasing slowly.

Figure 5:
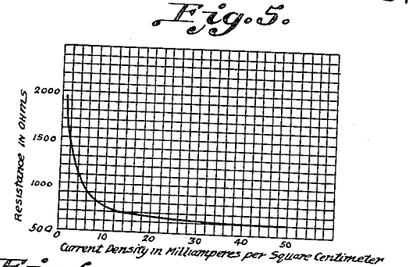
Figure 5 shows the curves of resistance to current density of copper oxide rectifiers used in one form of my invention.

Thus, as shown by the curve in Figure 5, as the current through the rectifier is increased from 0 to 4 or 5 milliamperes, per square centimeter, the rectifier resistance decreases first very rapidly then more slowly from infinitely to about 800 or 1000 ohms for a rectifier having a 3/16 inch diameter plates. As the current is further increased to 50 or 60 milliamperes per square centimeter, the resistance falls more and more slowly to about 500 to 600 ohms.

Inasmuch as the scale of the instrument connected to the rectifier depends upon the relation of its resistance to the resistance of the rectifier, this change in ohmic resistance with a change of current density flow through the rectifier must be taken into consideration. The rectifier type of alternating current instruments is found to have a truly uniform scale only when the resistance of the rectifier unit forms a negligible part of the total instrument resistance. As the rectifier resistance approaches the instrument resistance in value, the lower end of the scale becomes somewhat crowded or narrowed.

For example, in the case of a 5 volt instrument of 1000 ohms per volt sensitivity, the current flowing through the rectifier at full scale deflection is 1 milliampere. For this current, the rectifier resistance is in the vicinity of 1000 ohms. But at one volt when the current through the rectifier is only about a fifth of a milliampere, the rectifier resistance is 2000 ohms. Therefore, for one volt, the total instrument resistance has increased from 5000 to 6000 ohms. The impressed potential of one volt will therefore cause less than one-fifth of the deflection produced by the five volts.

In voltmeters with ranges of about 15 volts and with reasonably high sensitivity, the non-linearity of the scale is negligible. As either the range of sensitivity is increased, the non-linearity becomes more marked until at ranges of about 2 or 3 volts, it is found that about one-quarter of the scale measures a third of the full scale voltage.

This is exactly the opposite of what is desired with the null method of direction finding. As hereinbefore explained with the null method, the near zero indications should possess maximum sensitivity and instead of one-quarter of the scale measuring a third of the full scale voltage changes, the exact converse is desired.

Figure 9:
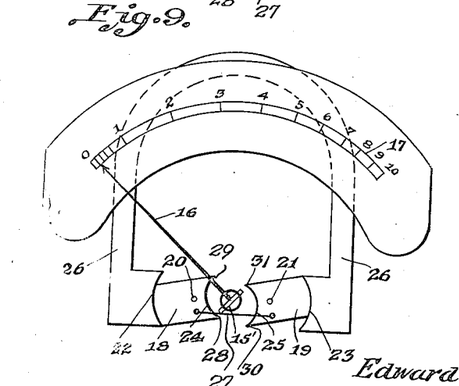

This is obtained by constructing the indicating instrument as shown in Figure 9. As shown, there is provided a pivotal armature 15' carrying a pointer 16 operating over a graduated scale 17. In operative relation with the armature 15' there are provided two pole-pieces 18 and 19. These pole-pieces 18 and 19 are pivotally mounted, as shown at 20 and 21. The edges 22 and 23 of the pole-pieces 18 and 19 opposite their faces 24 and 25 are in engaging relation with the pole extension 26 which completes the magnetic circuit through the armature and airgap.

Pole-pieces 18 and 19 may be angularly displaced about their pivots 20 and 21 to any desired degree in either direction by a manual adjusting screw or lever connected thereto. Preferably, pole-pieces 18 and 19 are controlled simultaneously by a common member, as for example link 27, so that the two pole pieces will be displaced clockwise or counter-clockwise simultaneously and through the same angular displacement.

Thus, for example, the pole-pieces may be made to assume the position shown in Figure 9 in which the upper end 29 of the pole-piece 18 has been moved away to increase its airgap. Simultaneously, the pole-piece 19 has been displaced so that its upper end 31 has been brought close to the armature to reduce the airgap therebetween while the lower end 30 has been moved away to increase the airgap there.

It should be noted that the edges 22 and 23 are curved to form the arcs of circles with 20 and 21 as centers and that the pole extension 26 in cooperation therewith has corresponding arc-shaped edges, so that as the pole pieces 18 and 19 are moved about their pivots 20 and 21, the edges 22 and 23 remain continually in engaging relation with the pole extension 26 to maintain a minimum reluctance of the magnetic path. With the pole pieces rocked, as shown in Figure 9, and the gaps at the edges 28 and 31 reduced to a minimum, the reluctance of the magnetic path including the pole-pieces, armature, and the airgaps, is a minimum while the pointer deflection is near zero.

When now the current through the receiving instrument is increased slightly, there is a change in the magnetic lines of force which produces a corresponding deflection of the pointer through a predetermined angle in accordance with the change in current flow.

Assuming now that the instrument pointer is nearer the end of the scale at its maximum deflected position, the armature is now in the position opposite the pole ends 29 and 30 where the gap is at a maximum. A corresponding change in current flow through the instrument at this position will not produce as large a change in the magnetic lines of force and accordingly the change in deflection for this change of current will not be as large as was the case for a similar change in current at or near the zero position of the instrument.

In other words, the instrument is more sensitive at or near the zero position and becomes decreasingly sensitive as the armature and pointer approach the maximum position. A substantially logarithmic response is thus effected. An exponent response where X is less than one may also be effected.

The characteristics of the rectifier by which its resistance decreases with increase in current density may be applied with advantage to the maximum method of direction indication since in the latter method the maximum sensitivity is desired at or near the maximum readings. This advantage may be further accentuated by using with the copper oxide rectifier system described in connection with Figure 1, the indicator shown in Figure 8.

Figure 8:
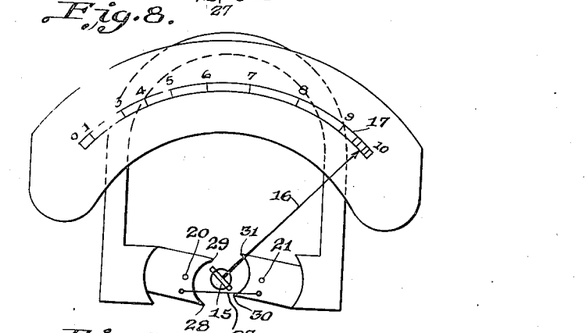
Figures 8 and 9 show alternative adjustments of my indicating instrument of Figure 7, the pole pieces in Figure 8 being in the position used for maximum method, and in Figure 9 for null method, operation.

As illustrated in Figure 8, the adjustment is such that the ends 29 and 30 are so placed as to secure a minimum airgap for maximum deflection and a maximum airgap for zero deflection. The response curve of the instrument then has the general form of a power curve with exponent greater than 1.

The type of indicator shown in Figures 7 to 9 may be used with the usual type of radio receiver as shown, for producing either a logarithmic or exponential response; or if desired, may be used with special circuits for exaggerating these effects. Thus, the logarithmic indicator, Figure 9, may be used with a sensitivity control circuit including variable mu tubes, as shown in Figure 4, for producing logarithmic response, or an exponential response to a more negative power. The exponential indicator of Figure 8 may be used with an exponential receiving circuit to produce higher powered exponential response than obtainable by either receiver or indicator individually. Although visual indicators are shown, it will be obvious to those skilled in the art that audible signal indicators may be used.

Figure 29:
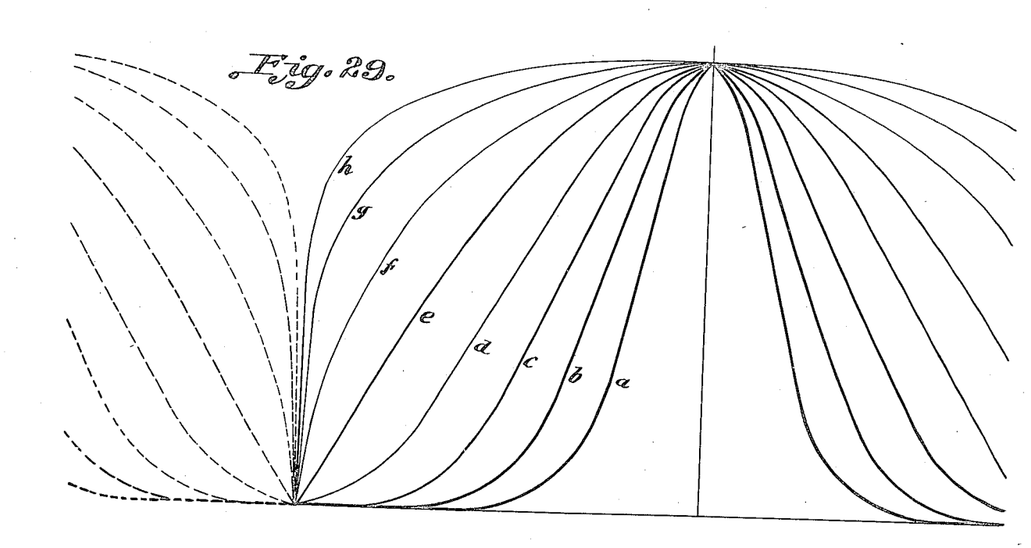
Figure 29 is a series of curves drawn to rectangular coordinates showing the shape of the signal waves for different receiver characteristics.

Figure 29 discloses a family of curves drawn to rectilinear coordinates. These curves illustrate how the normal response may be distorted at will to produce any desired degree of sharpness at either the maximum or minimum by the use of a non-linear device having a responsive curve following an exponential law alone, as given in Equation 3

(3) $$E_{output} = e^{X_{input}}$$

in which X may be equal to, greater than, or less than unity. The case in which X is greater than unity corresponds to the Equation 2 and the case in which X is less than unity corresponds to Equation 1.

Curve $e$ is a pure sine wave obtained when X=1 and is the output obtained in the directional systems heretofore used, when connected to a normal loop and a linear indicator. Curves, $f$, $g$, $h$, show how the receiver output according to the invention is distorted to increase the null sensitivity by Equation 3 where X is equal to ½, ¼ and ⅛, respectively.

Curves $a$, $b$, $c$ and $d$ show how the receiver output is distorted to increase the maximum sensitivity by Equation 3 where X=16, 8, 4, and 2, respectively.

In the following, the values used in plotting these curves are tabled:

| Degrees | $h$ Percent $\sqrt[8]{E}$ | $g$ Percent $\sqrt[4]{E}$ | $f$ Percent $\sqrt[2]{E}$ | $e$ Percent E | $d$ Percent $E^2$ | $c$ Percent $E^4$ | $b$ Percent $E^8$ | $a$ Percent $E^{16}$ |
|---|---|---|---|---|---|---|---|---|
| 0 | 0 | 0 | 0 | 0 | 0 | 0 | 0 | 0 |
| 1 | 60.3 | 36.5 | 13.3 | 1.74 | .03 | .009 | 81×10⁻⁶ | 64×10⁻¹⁰ |
| 5 | 73.7 | 54. | 29.4 | 8.7 | .75 | .056 | .003 | 9×10⁻⁶ |
| 10 | 80.3 | 64.5 | 41.5 | 17.36 | 3. | .09 | .008 | 64×10⁻⁶ |
| 20 | 87.4 | 76.4 | 58.5 | 34.2 | 10.35 | 1.08 | .012 | .0014 |
| 30 | 91.7 | 84. | 70.5 | 50. | 25. | 6.25 | .39 | .0152 |
| 40 | 94.6 | 89. | 80. | 64.28 | 41.5 | 17.3 | 3. | .09 |
| 50 | 96.7 | 93.5 | 87.2 | 76.60 | 59. | 34.8 | 12.2 | 1.47 |
| 60 | 98.2 | 96. | 92.6 | 86.60 | 75. | 56.5 | 32. | 10.2 |
| 70 | 99.1 | 98. | 96.8 | 93.97 | 89. | 74. | 55. | 30.5 |
| 80 | 99. | 99. | 99. | 98.48 | 97.5 | 95. | 90. | 81. |
| 85 | 99. | 99. | 99. | 99.62 | 98.56 | 97.5 | 95. | 90. |
| 89 | 99. | 99. | 99. | 99.985 | 99.975 | 99.5 | 99. | 98.5 |
| 90 | 100. | 100. | 100. | 100. | 100. | 100. | 100. | 100. |

Figure 2:
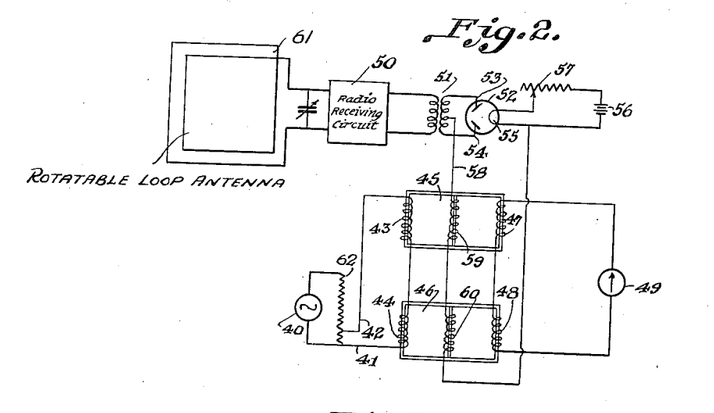
Figure 2 is a modified form of my invention in which saturated transformers are used to carry out my invention.
Figure 3:
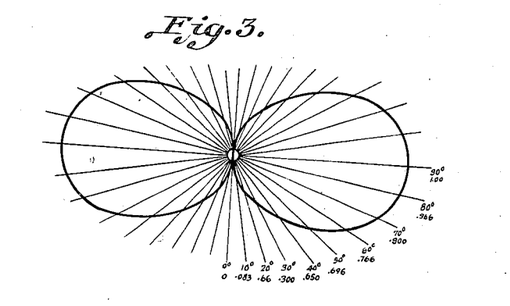
Figure 3 is a curve drawn to polar coordinates showing the relationship between the various angular positions of a directional or loop antenna and the signal intensity as indicated on an output meter of the type described, in a system utilizing my invention.

Figure 2 illustrates a further circuit modification of my invention. In this embodiment of my invention, a rotatable loop antenna and radio receiver circuit similar to that described in connection with Figure 1 are employed. In place, however, of the special indicator, I provide a special transformer construction for producing a logarithmic response reading in a linear indicator. In accordance with this embodiment I provide an oscillator such as, for example, a 50 cycle oscillator 40 connected across a 6,000 ohm resistance 62. Connected across 50 ohms thereof are the leads 41 and 42 extending in series through the primary windings 43 and 44 of the two transformers 45 and 46. The secondaries 47 and 48 of the two transformers 45 and 46 are also connected in series and through a vibration galvanometer 49.

The pair of transformers is assembled and placed one in each compartment of an iron screening box, preferably set in paraffin wax. The secondaries are wound so that when connected in series, as shown, they have the necessary direct current resistance to damp the galvanometer with respect to rapid response and also have a reactance not exceeding the direct current resistance of the circuit.

By providing the proper ohmic resistance at 41, 42 in series with the primary, the circuit in the primary of the transformer is not affected by the change in the magnetization of the core. The secondary impedance is not affected by changes in magnetization of the core and the necessary high series impedance is supplied by the galvanometer. The magnetization force in all parts of the iron is substantially proportional to the current which flows in the saturation windings 59, 60 assuming no magnetic leakage.

The current to be indicated or measured is received over the loop antenna 61 connected to the receiver 50. The output from receiver 50 is, in turn, connected to the primary of transformer 51, the secondary of which is in turn connected to the anodes of a full wave gas filled rectifier tube such as tube 52. Tube 52 comprises an envelope enclosing anodes 53 and 54 and a common cathode 55. The cathode 55 is heated from a source 56 controlled by resistance 57. Extending from the mid-point of the secondary of transformer 51 is the lead 58 connected to the two auxiliary saturating windings 59 and 60 of transformers 45 and 46, respectively.

It is an obvious advantage to have no coupling between either the primary or secondary windings and the saturation coil which might result in the latter feeding back into its source of supply. Consequently, each primary and secondary may, if desired, be wound in two halves, one half of each being assembled on each of the outer limbs of the transformer core.

The current in the transformer secondaries due to the oscillator 40 is increased and decreased as the amplitude of the current in windings 59 and 60 varies. As the current from the rectifier saturates the transformer, the currents induced in the secondary due to oscillator 40 decrease in amplitude. Accordingly, the indication of the galvanometer varies inversely as the input current to be measured varies.

Figure 6:
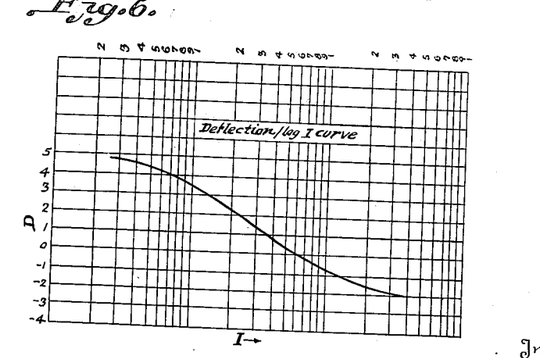
Figure 6 consists of curves showing the instrument calibrations used in a modification of my invention.

Figure 6 is a curve showing the deflection of the galvanometer 49 (Fig. 2) against the current applied to the saturation coil from the full wave rectifier. The curve is plotted in logarithmic coordinates and it will be observed that there is an approximately straight portion in the curve, above and below which the rate of change of D with I is very small. Figure 6 therefore shows that the arrangement of Figure 2 produces a variation of meter deflection with input current which is sensibly logarithmic throughout a substantial range and approximately so throughout a still greater range.

On reducing the current I from maximum to zero, a slightly different path is followed by the D—I curve from that taken for ascending values of I. This effect is due to hysteresis, and being only slight is not of much importance.

Although I have illustrated my invention by the preferred forms of radio receivers and indicators, it will be obvious to those skilled in the art, that other means for and methods of varying the ratio of input voltage to output voltage may be employed and are part of my invention. Furthermore, my invention may be applied to directional and distance finding systems, and I do not intend to limit myself except as set forth in the appended claims.

What is claimed is:

1. In a directional system including a rotatable, directional antenna, a vacuum tube amplifier, and an indicator; the method of directional reception comprising receiving variable amounts of radiant energy in accordance with the position of the directional antenna with respect to the direction to the source of said radiant energy; impressing the received energy across the input of the amplifier; amplifying the impressed energy; rectifying part of said energy to establish a direct-current biasing potential; and applying said biasing potential to a control grid of said amplifier whereby said energy is amplified in accordance with a non-linear exponential law such that as the input energy impressed on the amplifier from the directional antenna varies in accordance with the direction of reception of the signal the output of said amplifier will form a figure 8 which is substantially distorted so as to greatly increase the rate of change of the radio signal impressed on said indicator in the vicinity of at least one portion of said figure 8, upon rotation of the antenna.

2. In a directional system including a rotatable, directional antenna, a vacuum tube amplifier, and an indicator, the method of directional reception comprising receiving variable amounts of radiant energy in accordance with the position of the directional antenna with respect to the direction to the source of said radiant eenrgy; impressing the received energy across the input of the amplifier; and automatically controlling the amplification of said amplifier in response to the variations in the magnitude of the energy in the output of said amplifier so as to amplify the impressed energy in accordance with a non-linear exponential law such that as the input energy impressed on the amplifier from the directional antenna varies in accordance with the direction of reception of the signal, the output of said amplifier will form a figure 8 which is substantially distorted so as to greatly increase the rate of change of the radio signal impressed on said indicator in the vicinity of at least one portion of said figure 8, upon rotation of the antenna.

3. In a directional system, a tunable, rotatable, directional antenna; a vacuum tube amplifier having an input and an output; means for connecting the input of said amplifier to said antenna, whereby variable amounts of signal energy are impressed on the input of said amplifier in accordance with the position of the antenna with respect to the direction to the distant source of said energy; said amplifier including means for amplifying the impressed energy, at the frequency to which said antenna is tuned, in accordance with a non-linear exponential law over the entire range of amplitude variations produced by all the positions of the rotatable antenna such that as the input energy impressed on the amplifier from said antenna varies in accordance with the direction of reception of the signal, the output of said amplifier will form a figure 8 which is substantially distorted as compared to the normal circle figure 8; an indicator; and means for impressing signals from said amplifier on said indicator whereby, for predetermined changes in the input, the indicator response is more pronounced in the vicinity of at least one portion of said figure 8 than at other portions thereof.

4. In a directional system, a tunable, rotatable, directional antenna; a vacuum tube amplifier having an input and an output; means for connecting the input of said amplifier to said directional antenna, whereby variable amounts of signal energy are impressed on the input of said amplifier in accordance with the position of the directional antenna with respect to the direction of the distant source of said energy; and means automatically controlling the amplification of said amplifier in response to the variation in the magnitude of the energy in the output of said amplifier, so as to amplify the impressed energy in accordance with a non-linear exponential law over the entire range of amplitude variations produced by all the positions of the directional antenna such that as the input energy impressed on the amplifier from the directional antenna varies in accordance with the direction of reception of the signal the output of said amplifier will form a figure 8 which is substantially distorted as compared to the normal circle figure 8; an indicator; and means for impressing signals from said amplifier on the indicator whereby, for predetermined changes in the input, the indicator response is more pronounced in the vicinity of at least one portion of said figure 8 than at other portions thereof.

5. In a directional system including a rotatable, directional antenna, a vacuum tube amplifier, and an indicator; the method of directional reception comprising receiving variable amounts of radiant energy in accordance with the position of the directional antenna with respect to the direction to the source of said radiant energy; impressing the received energy across the input of the amplifier; amplifying the impressed energy; rectifying part of said energy to establish a direct-current biasing potential; and applying said biasing potential to a control grid of said amplifier whereby said energy is amplified in accordance with a non-linear exponential law such that as the input energy impressed on the amplifier from the directional antenna varies in accordance with the direction of reception of the signal the output of said amplifier will form a figure 8 which is substantially elongated as compared to the normal circular figure 8; and impressing signals from said amplifier on said indicator whereby said indicator response is more pronounced for predetermined changes in the input at the maximum of the figure 8 than in the case of a circular figure 8.

6. In a directional system including a rotatable, directional antenna, a vacuum tube amplifier, and an indicator; the method of directional reception comprising receiving variable amounts of radiant energy in accordance with the position of the directional antenna with respect to the direction to the source of said radiant energy; impressing the received energy across the input of the amplifier; and automatically controlling the amplification of said amplifier in response to the variation in the magnitude of the energy in the output of said amplifier so as to amplify the impressed energy in accordance with a non-linear exponential law such that as the input energy impressed on the amplifier from the directional antenna varies in accordance with the direction of reception of the signal, the output of said amplifier will form a figure 8 which is substantially elongated as compared to the normal circular figure 8; and impressing signals from said amplifier on the indicator whereby the indicator response is more pronounced for predetermined changes in the input at the maximum of the figure 8 than in the case of a circular figure 8.

7. In a directional system, a tunable, rotatable, directional antenna; a vacuum tube amplifier having an input and an output; means for connecting the input of said amplifier to said directional antenna, whereby variable amounts of signal energy are impressed on the input of said amplifier in accordance with the position of the directional antenna with respect to the direction to the distant source of said energy; said amplifier including means for amplifying the impressed energy at the frequency to which said antenna is tuned, in accordance with a non-linear exponential law over the entire range of amplitude variations produced by all the positions of the directional antenna such that as the input energy impressed on the amplifier from the directional antenna varies in accordance with the direction of reception of the signal, the output of said amplifier will form a figure 8 which is substantially elongated as compared to the normal circular figure 8; an indicator; and means for impressing signals from said amplifier on said indicator whereby the indicator response is more pronounced for predetermined changes in the input at the maximum of the figure 8 than in the case of a circular figure 8.

EDWARD JOSEPH HEFELE.

CERTIFICATE OF CORRECTION.

Patent No. 2,172,536. September 12, 1939.

EDWARD JOSEPH HEFELE.

It is hereby certified that error appears in the printed specification of the above numbered patent requiring correction as follows: Page 2, first column, lines 13 and 14, for the words "figure of eight" read figure 8; page 3, first column, line 52, for "expontial" read exponential; and second column, line 51, for "instrumest" read instrument; page 4, first column, line 3, for "infinitely" read infinity; and second column, line 42, for "exponent" read exponential; page 5, second column, line 55-56, for "substntial" read substantial; page 6, first column, line 28, claim 2, for "eenrgy" read energy; line 32, same claim, for "variations" read variation; and second column, line 3, claim 4, for "of" first occurrence, read to; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.

CERTIFICATE OF CORRECTION.

Patent No. 2,172,536.

September 12, 1939.

EDWARD JOSEPH HEFELE.

It is hereby certified that the above numbered patent was erroneously issued to "Airplane & Marine Direction Finder, Inc., a corporation of Delaware" whereas said patent should have been issued to Airplane and Marine Direction Finder Corporation, a corporation of New York, as shown by the record of assignments in this office; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.